(12) United States Patent
Al-Ruwaili

(10) Patent No.: US 7,168,310 B2
(45) Date of Patent: Jan. 30, 2007

(54) ACCURACY OF SHALY SAND FORMATION EVALUATION

(75) Inventor: Saleh Al-Ruwaili, Dhahran (SA)

(73) Assignee: Saudi Aramco, Dhahran (SA)

( * ) Notice: Subject to any disclaimer, the term of this patent is extended or adjusted under 35 U.S.C. 154(b) by 51 days.

(21) Appl. No.: 10/927,974

(22) Filed: Aug. 26, 2004

(65) Prior Publication Data

US 2006/0042369 A1 Mar. 2, 2006

(51) Int. Cl.
*E21B 47/00* (2006.01)

(52) U.S. Cl. .............................. 73/152.18; 73/152.01; 73/152.02; 73/152.04

(58) Field of Classification Search ............. 73/152.18, 73/152.01, 152.04, 152.05, 152.07, 152.08
See application file for complete search history.

(56) References Cited

U.S. PATENT DOCUMENTS

| | | | |
|---|---|---|---|
| 4,346,592 A | | 8/1982 | Fertl et al. |
| 4,369,497 A | | 1/1983 | Poupon et al. |
| 4,403,290 A | | 9/1983 | Clavier et al. |
| 4,495,604 A | * | 1/1985 | Clavier et al. ................ 367/25 |
| 4,502,121 A | | 2/1985 | Clavier et al. |
| 4,531,188 A | | 7/1985 | Poupon et al. |
| 4,594,887 A | * | 6/1986 | Fertl et al. ................ 73/152.06 |
| 4,622,849 A | * | 11/1986 | Fertl ....................... 73/152.14 |
| 4,756,189 A | * | 7/1988 | Fertl et al. ............... 73/152.02 |
| 4,833,914 A | * | 5/1989 | Rasmus .................... 73/152.03 |
| 4,903,527 A | * | 2/1990 | Herron .................... 73/152.05 |
| 5,557,200 A | * | 9/1996 | Coates ....................... 324/303 |
| 5,786,595 A | | 7/1998 | Herron et al. |
| 6,470,274 B1 | * | 10/2002 | Mollison et al. ............... 702/7 |
| 6,711,502 B2 | * | 3/2004 | Mollison et al. ............... 702/6 |
| 6,727,696 B2 | * | 4/2004 | Kruspe et al. ............. 324/303 |

OTHER PUBLICATIONS

Poupon, et al, Log Analysis of Sand-Shale Sequence-A Systematic Approach, J. Pet. Tech., Jul. 1970, pp. 867-881.
Poupon, et al, Log Analysis in Formations with Complex Lithologies, J. Pet. Tech. Aug. 1971, pp. 995-1005.
Waxman, M.H. et al, L.J. M. 1968, Electrical Conductivities in Oil-Bearing Shaly Sands, Soc. Pet. Engrs. J. 8, 107-122.
Poupon, A., et al, 1971 Evaluation of Water Saturations in Shaly Formations, Trans. SPWLA 12th Ann. Logging Symp. 01-2.
Clavier, C., et al 1977 The Theoretical and Experimental Bases for the "Dual Water" Model for the Interpretation of Shaly Sands, Soc. Pet. Engrs. J. 24,15.
Worthington, P.F., 1985 The Evolution of Shaly-Sand Concepts in Reservoir Evaluation. The Log Analyst (Jan.-Feb. 1985) pp. 23-40.
Keelan, D.K., et al 1979 Application of Cation Exchange Capacity in a Study of the Shannon Sand of Wyoming, SPWLA 20th Ann. Logging Symp.

(Continued)

*Primary Examiner*—Hezron Williams
*Assistant Examiner*—Rodney Frank
(74) *Attorney, Agent, or Firm*—Bracewell & Giuliani LLP

(57) ABSTRACT

A novel process and methodology in deterministic formation evaluation is provided. The formation evaluation results can accurately quantify formation attributes, such as clay-volume, clay-bound-water, effective-porosity and water saturation in shaly sands. Total-porosity is determined using porosity-logs, such as density, neutron and sonic logs. After clay-volume and total-porosity are determined, sand volume (quartz, feldspar, mica . . . ) is the remaining part in the bulk formation evaluated, see FIG. 5.

14 Claims, 12 Drawing Sheets

OTHER PUBLICATIONS

Dewan, J.T., Modern Open-Hole Interpretation (Penn Well Publishing, 1983) Chap. 7, pp. 227-267.

Clavier, C., et al 1984 Theoretical and Experimental Bases for the Dual-Water Model for Interpretation of Shaly Sands, SPEJ vol. 21, No., pp. 153-168.

* cited by examiner

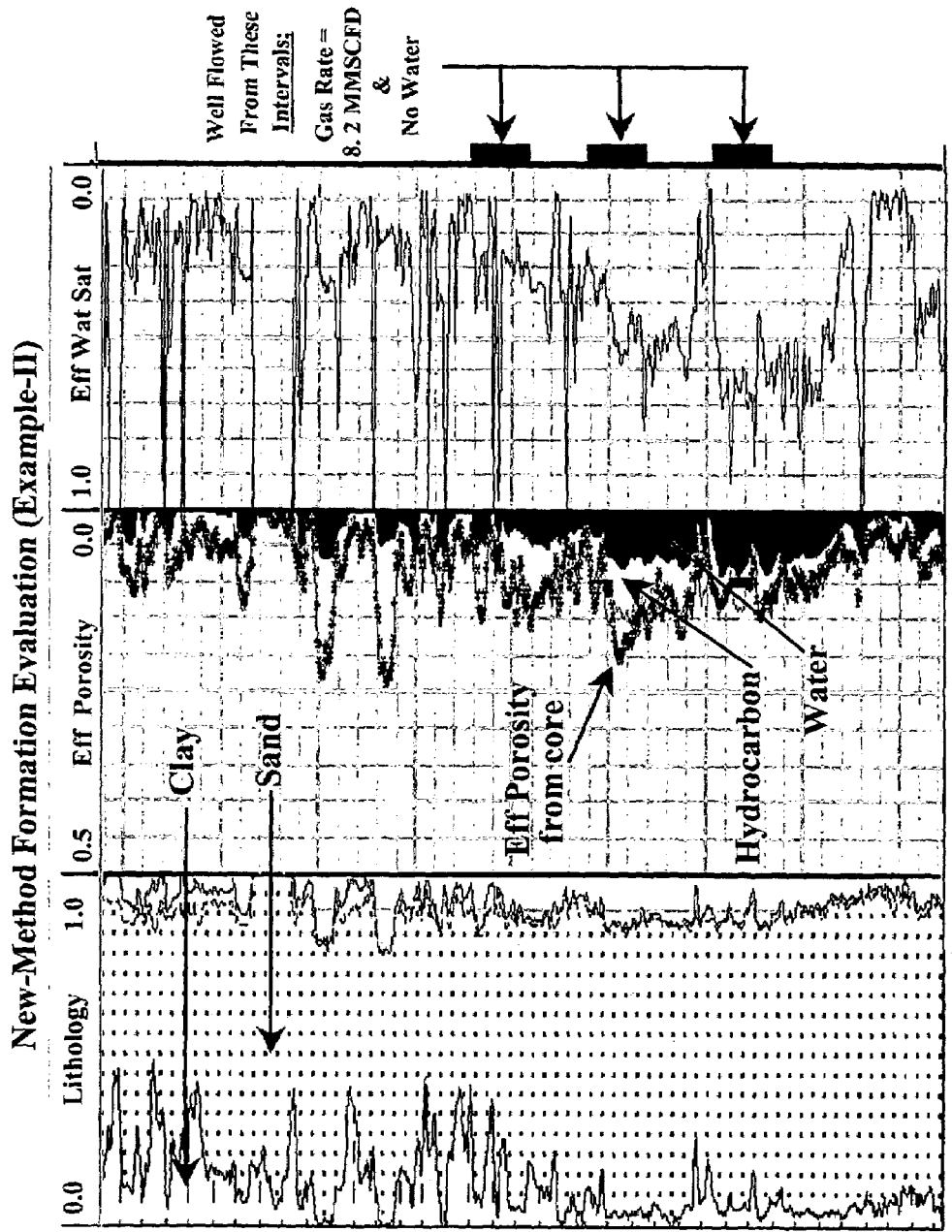

ACCURACY OF SHALY SAND FORMATION EVALUATION

BACKGROUND OF THE INVENTION

1. Field of Invention

The present invention relates to evaluation of subsurface earth formations to assess their composition and contents. More specifically, the present invention relates to accurate quantification of the effects of clay on data obtained from shaly sands.

2. Description of the Prior Art

It has long been the practice to evaluate subsurface formations, usually sands of interest, based on well logs obtained from wells in these formations. Parameters such as porosity and water saturation were determined. From these parameters, an assessment of the hydrocarbon content of the formation could be made.

Typically, the formation lithology included minerals which were termed clay or clay minerals. For a considerable time, shaly sand formation evaluation could not accurately quantify clay from standard well logs. Therefore, the effects of clay on porosity and resistivity logs were not accurately incorporated in shaly sands formation evaluation. Consequently, conventional formation evaluation of shaly sands has had some inaccuracy associated with its calculation of effective porosity and water saturations.

In logging analysis, formation evaluation of shaly-sands estimated total porosity, shale or clay volume, quartz or sand volume, effective porosity and water saturations of reservoir formations. Of course, hydrocarbon saturation was obtainable once water saturations could be estimated.

So far as is known, most prior art methods in shaly sand formation evaluation estimated shale abundance in the formation and incorporated the estimated shale-volume in calculating other formation attributes, such as effective-porosity. Examples of this were U.S. Pat. Nos. 4,403,290; 4,369,497 and 4,502,121. A very common practice in prior art methods in formation evaluation was to use gamma ray log to determine shale volume, as in U.S. Pat. No. 4,346,592. The highest readings of the gamma ray log (GR_MAX) were used to determine the 100% shale sections across a geological unit in the formation. Similarly, the lowest readings of the gamma ray log (GR_MIN) were used to determine the 0.0% shale sections across a geological unit in the formation. Afterwards, the shale at every depth point in such geological unit of the formation was quantified as Shale-Volume=(GR−GR_MIN)/(GR_MAX−GR_MIN), where GR is the gamma ray log reading at every depth point across the geological unit in the formation. In addition, other logs like density, neutron, spontaneous-potential and others were used in estimating shale-volume, as in U.S. Pat. Nos. 4,369,497 and 4,502,121.

Thus, quantifying pure clay abundance and incorporating its effects on porosity and water-saturation evaluation was not accurately accomplished in prior formation evaluation art. As has been discussed above, most prior art formation evaluation approaches quantified shale abundance and incorporated its effects in calculating other formation attributes. Occasionally, some prior formation evaluation methods, such as U.S. Pat. No. 4,346,592, used shale and clay terms as if they are equivalent when in fact they are not.

Typical formation shale is composed of clay, mica, feldspar, iron oxide, organics and other material. Sometimes, prior formation evaluation approaches like U.S. Pat. Nos. 4,531,188; 4,756,189; 4,502,121 and 4,369,497 attempted estimating clay from standard logs. Nonetheless, careful review of these methods revealed that one of two assumption or estimates usually was made. One was that the estimated clay was closer to shale than to pure clay, as in U.S. Pat. Nos. 4,531,188 and 4,756,189. The other was that the estimated clay was based on inaccurate definition of clay, as in U.S. Pat. Nos. 4,369,497 and 4,502,121, which assumed that Shale-Volume=Silt-Volume+Clay-Volume.

Generally, such prior formation evaluation approaches were associated with some inaccuracy in estimating effective porosity and water-saturation. Inaccuracy associated with effective porosity calculation in prior formation evaluation methods was due to the difficulty in obtaining accurate shale-volume, and due to the difficulty in incorporating accurate shale effects into effective porosity calculation.

Relations expressing total porosities, measured by density and neutron logs, in terms of effective porosity, shale volume, shale porosity, hydrocarbon saturation and hydrocarbon porosity were available in U.S. Pat. Nos. 4,369,497; 4,403,290 and 4,502,121. When hydrocarbon effects were negligible on density and neutron logs, the relationship between total porosity (from density and neutron logs), effective porosity, shale-porosity and shale-volume was as follows:

$$\Phi_{total} = \Phi_{effective} + \Phi_{shale} \cdot \text{Vol}_{shale} \quad (1)$$

Where $\Phi_{shale}$ was the shale pore-volume relative to the total shale volume and $\text{Vol}_{shale}$ was the volume of shale relative to the formation bulk volume.

Sometimes $\Phi_{shale}$ was approximated by $\Phi_{total}$ and Equation (1) reduced to the following:

$$\Phi_{total} = \Phi_{effective} + \Phi_{total} \cdot \text{Vol}_{shale} \quad (2)$$

Obtaining accurate effective-porosity from Equation (1) required accurate estimates for shale-volume and shale-porosity. This was, however, difficult during most times, especially in estimating an accurate measure of shale-porosity.

Estimating shale-porosity from porosity logs in the 100% shale sections was not accurate due to a number of reasons. First, the selection of 100% shale section could be wrong. Second, the porosity tools readings in such sections were mostly erroneous as they were affected by hydrogen index, shale composition and characteristics. Third, the so-called 100% shale section may not actually exist in the entire formation-interval to be evaluated. Fourth, the selection of 100% shale section was mostly subjective and the selected section might be different from one log analyst to another. Furthermore, shale-porosity in sections other than the 100% shale sections (sections where shale-volume is not 100%) was usually approximated by the same value estimated in the 100% shale sections. That introduced more inaccuracy in the shale porosity calculation. For these reasons, effective-porosity obtained from Equation (1) was mostly associated with inaccuracy.

Similarly, Equation (2) did not provide accurate effective-porosity, since the approximation of shale-porosity by total-porosity was inaccurate most of the time. Hence, effective-porosity, obtained using known methods, was associated with some amount of inaccuracy. The measures obtained were known to be inaccurate, but the extent of the inaccuracy could not be determined.

Inaccuracy associated with water saturation calculations, in prior methods of shaly sand formation evaluation, was due to number of possible reasons. The extra conductivity caused by the clay present in the shaly sand is not accounted for by Archie's equation. Thereby prior formation evaluation methods using Archie's equation could not account for the clay effects on saturation calculations, hence were mostly overestimating water saturations in shaly sands. Some prior methods used Waxman Smits and Dual Water to account for the extra conductivity caused by clay yet they could not have accurate measures for clay cation-exchange-capacity and clay-bound-water, which are required by Waxman Smits and Dual Water models. Thereby, such prior method could not obtain accurate relations for water saturations in shaly sands. Furthermore, most of the numerical techniques used by prior methods, to solve for water saturations from Waxman Smits or Dual Water equations, were not accurately converging.

SUMMARY OF INVENTION

Briefly, the present invention provides a new and improved method and apparatus for obtaining a measure of subsurface formation fluid contents adjacent a well borehole in a formation characterized as containing shaly sand, clay and fluid as formation constituents. The measures of formation constituents are obtained from data readings acquired by a well logging tool, and if desired from laboratory data. The well logging tool may be a composite logging tool capable of obtaining several types of well logging readings in a single run in the well bore, or may be one of a set of well logging tools each run separately in the well bore on different logging runs to obtain one or more readings of data of interest.

The well logging readings are then processed in a data processor in a group of processing steps to obtain a measure of subsurface fluid contents of the formation. The processing steps include obtaining a measure of the total porosity of the formation, and obtaining a measure of the dry clay volume of the formation. A measure of the clay-bound water volume of the formation is obtained, and the effective porosity of the formation is determined.

A measure of the total water saturation of the formation is obtained, and a measure of the clay-bound water saturation of the formation is obtained. The free water saturation of the formation is determined, and the effective water saturation of the formation is then determined.

The present invention thus provides data measurements for evaluating subsurface formations adjacent well boreholes for purposes of completing and producing hydrocarbons from the formations. The present invention accurately quantifies constituents of formations containing shaly sand, thereby provides accurate information for assessing the presence of hydrocarbons in such formations. This information enables better-informed decisions to be made with respect to hydrocarbon production from subsurface formations.

The present invention also provides a data processor which performs the processing steps according to the present invention and provides an analyst with output displays of the processing results for evaluation and assessment of the subsurface formation. The present invention further provides a computer program product in the form of machine-readable instructions for causing the processor to perform the processing steps according to the present invention.

BRIEF DESCRIPTION OF THE DRAWINGS

The objects, advantages and features of the invention will become more apparent by reference to the drawings appended thereto, wherein like numerals indicate like parts and wherein an illustrated embodiment of the invention is shown, of which:

FIGS. 10A, 10B and 10C are plots of well logs of lithology, effective porosity and effective water saturation, respectively, obtained according to the present invention as a function of the same borehole depth as the logs of FIGS. 9A, 9B and 9C.

DESCRIPTION OF THE PREFERRED EMBODIMENT

Figure 1:
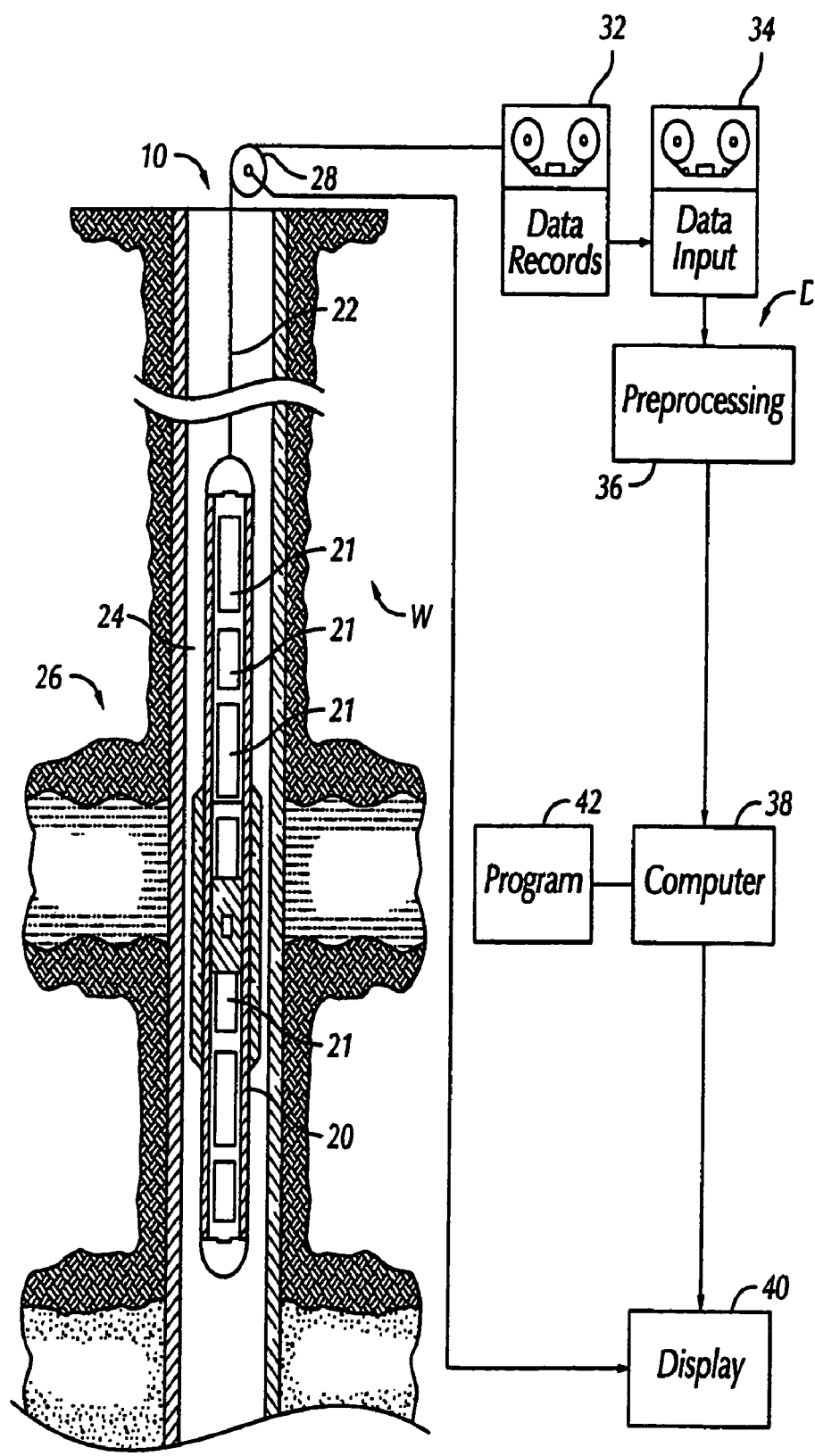
FIG. 1 is a schematic diagram, taken partly in cross-section, of a well logging system disposed in a well borehole adjacent subsurface formation.

In the drawings, a conventional well logging system W is shown in FIG. 1 at a well 10. A sonde 20 containing one or more well logging instruments 21 is lowered by a conductive wireline cable 22 into a well bore 24 to obtain the responses of subsurface formations 26 to each of the well logging instruments in the sonde 20. It is preferable with the present invention that the following types of well logging measurements be obtained from the subsurface formations 26: a resistivity log, e.g. induction log, laterolog; a gamma ray log; and a porosity log, e.g. density log, neutron log, sonic log. It should be understood that the sonde 20 need not contain all of these logging instruments, and may contain one or more of such instruments. In the latter case, sufficient logging passes are made with different well logging tools to obtain well logging measurements of all desired types for formation depths of interest.

During the well logging runs, the sonde 20 and cable 22 are suitably supported such as by a sheave wheel 28. The well logging measurements obtained by the well logging instruments are recoded as functions of borehole depth in a suitable data memory 32. Once recorded, the well logging data measurements may be transferred as needed into a data input unit 34 of a data processing system D. The well logging data measurements are subjected to conventional preprocessing in a preprocessing unit 36 and then to a computer 38 for processing according to the present invention in a manner to be set forth below. The processed results from computer 38 are then available for analysis on a suitable display or plotter 40.

The computer 38 can be a mainframe computer of any conventional type of suitable processing capacity such as those available from International Business Machines (IBM) of Armonk, N.Y. or other source. Other digital processors, however, may be used, such as a laptop computer, or any other suitable processing apparatus.

In any case, the processor of the computer 38 accesses the well logging data measurements to undertake the logic of the present invention, which may be executed by a processor as a series of computer-executable instructions. The instructions may be contained on a data storage device 42 with a computer readable medium, such as a computer diskette shown in FIG. 1 having a computer usable medium stored thereon. Or, the instructions may be stored in memory of the computer 38, or on magnetic tape, conventional hard disk drive, electronic read-only memory, optical storage device, or other appropriate data storage device.

Figure 6:
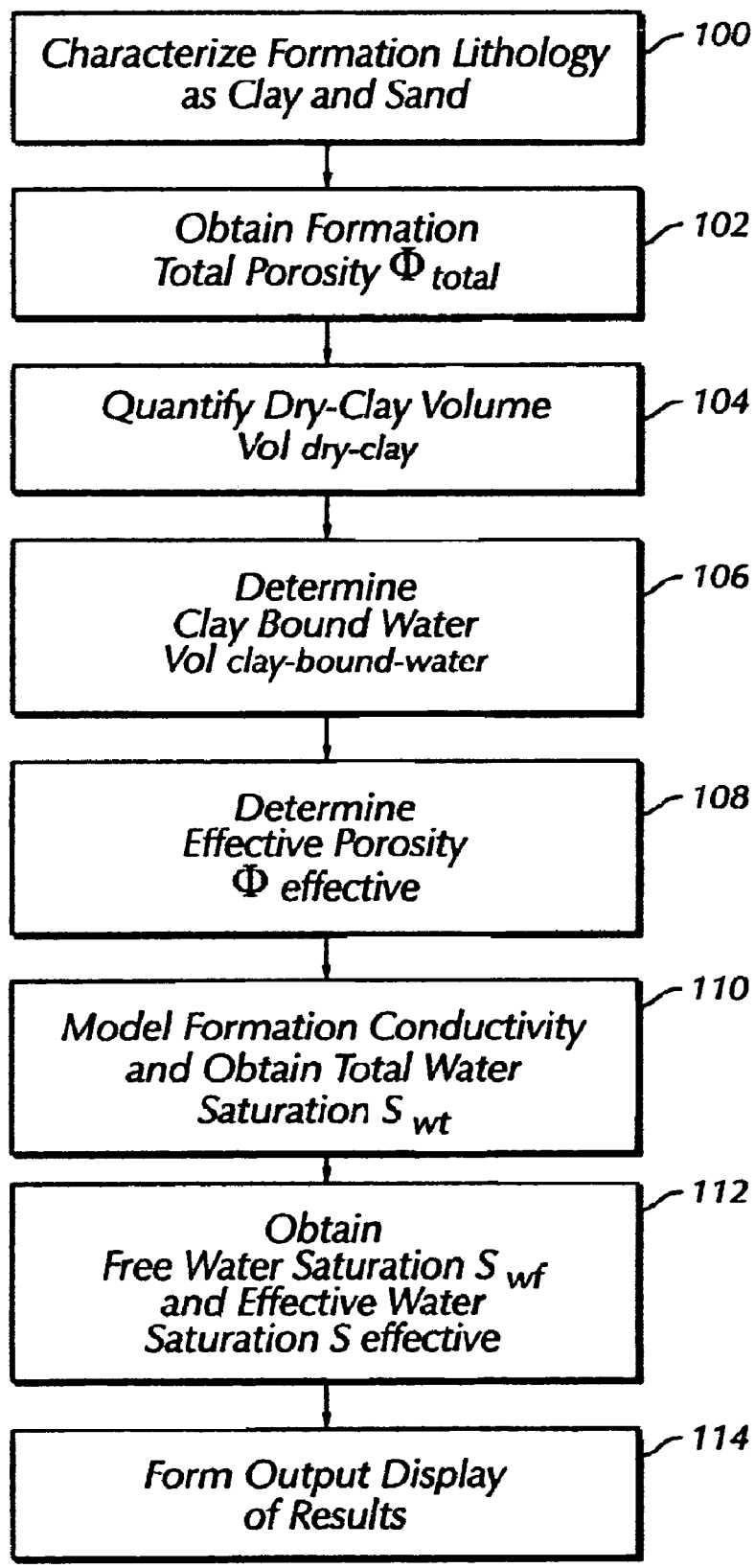
FIG. 6 is a block diagram of processing steps according to the present invention.

The flow chart of FIG. 6 herein illustrates the structure of the logic of the present invention as embodied in computer program software. Those skilled in the art will appreciate that the flow charts illustrate the structures of computer program code elements including logic circuits on an integrated circuit that function according to this invention. Manifestly, the invention is practiced in its essential embodiment by a machine component that renders the program code elements in a form that instructs a digital processing apparatus (that is, a computer) to perform a sequence of function steps corresponding to those shown.

It is important to note that, while the present invention has been, and will continue to be, described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives, and CD ROMs, and transmission-type media such as digital and analog communication links.

The responses of the various logging tools clearly depend on the reservoir properties of the geological formations 26 surrounding the borehole 24. The log analysis according to the present invention is to assess the composition and contents of the subsurface formations and to accurately quantify the effects of clay on data obtained from formations when shaly sand is present.

Figure 5:
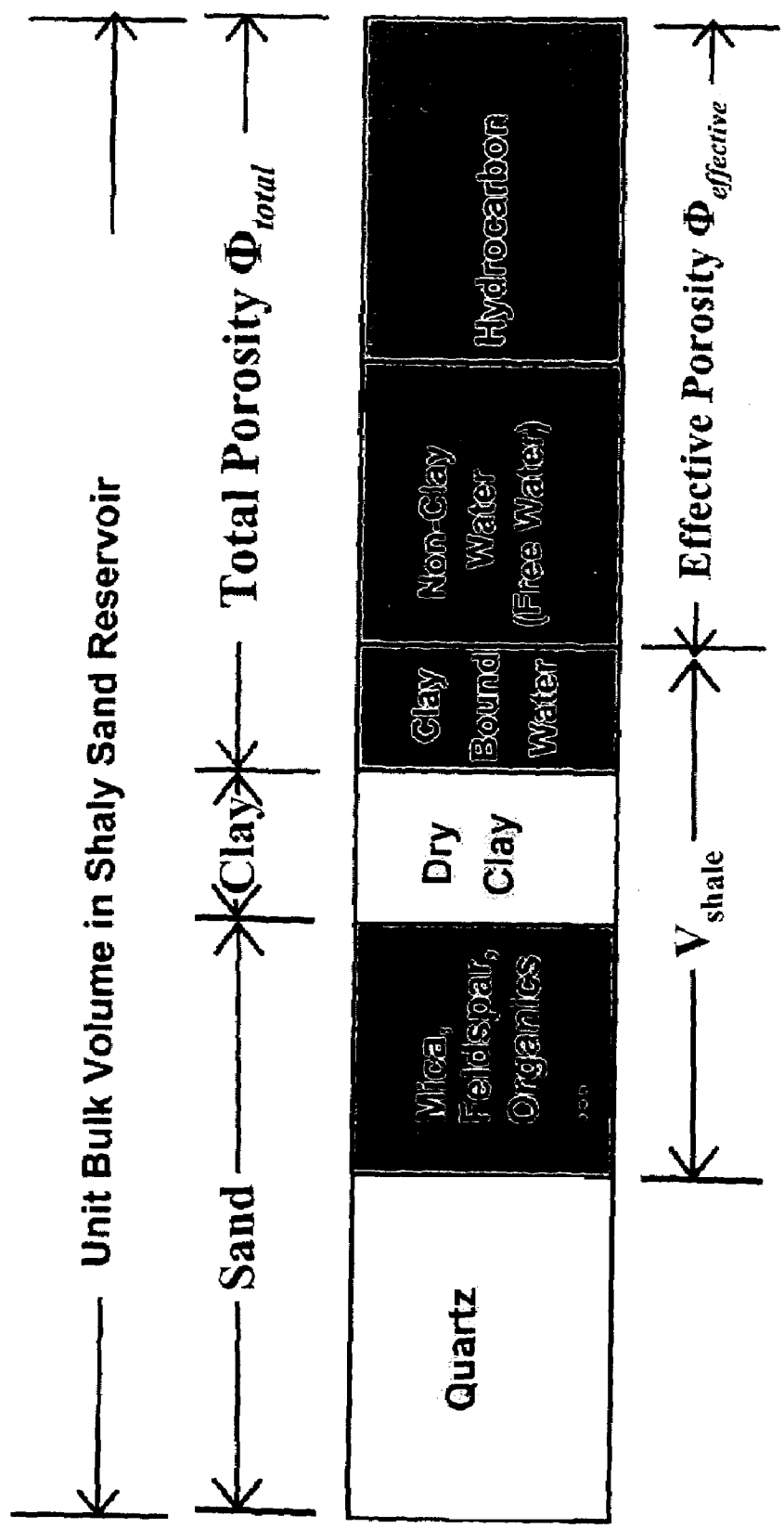
FIG. 5 is a schematic diagram depicting components of a shaly sand earth formation and their relation to various parameters used in well formation analysis.

The effective porosity, $\Phi_{effective}$, in a subsurface formation, such as shown in FIG. 1, is the pore space of the formation that is filled with hydrocarbon and non-clay water. The effective water saturation, $S_{effective}$, of the formation is the non-clay water percentage in the effective porosity as illustrated in FIG. 5, to be discussed in more detail below. Obtaining accurate value of $S_{effective}$ according to the present invention enables accurate calculation of hydrocarbon saturation since $S_{effective}+S_{hydrocarbon}=1$. Obtaining accurate effective porosity and accurate hydrocarbon saturation of a formation enables accurate hydrocarbon-in-place assessment, which is necessary in any hydrocarbon production business.

The present invention is applicable and accurate in both clean and shaly sand formations. In clean formations, Clay-Volume is null and the methodology of the present invention takes into account the absence of shaly sand formations and reduces to conventional techniques that are accurate in clean formations. In shaly formations, clay is present and its effects on porosity and saturation measurements are modeled or accounted for by the present invention to obtain accurate effective porosity, water saturations and hydrocarbon saturation. The present invention methodology has been applied in real data analysis and its results have been found better matched to actual hard data than conventional analysis results. Additionally, the results of the present invention were found to better agree with well-testing results than conventional methods.

The inaccuracy associated with effective porosity calculations in prior formation evaluation methods has been discussed in the section Description of the Prior Art above. Basically, prior formation evaluation methods, that used shale-quartz lithology system, had difficulty in obtaining accurate shale-volume and shale-porosity. Hence the prior art methods could not, so far as is known, incorporate accurate shale effects into effective porosity calculation. Similarly, prior formation evaluation methods which attempted using a clay-sand lithology system could not obtain accurate volumes of clay and clay-bound-water, and thereby could not obtain accurate effective porosity.

Inaccuracy in calculating water saturations in prior formation evaluation approaches is due to one of several reasons, depending on the evaluation method used. One such approach is solving for water saturation in shaly sands from Archie's equation, which is appropriate for clean rocks. See Equation (3)

$$C_t = \Phi_{total}^m \cdot S_w^n \{C_w\} \qquad (3)$$

Here, $C_t$ is the formation conductivity which can be obtained from deep resistivity logs, $C_w$ is the formation water conductivity, $S_w$ is the formation water saturation, $\Phi_{total}$ is the formation total porosity, m is a constant that can be determined experimentally on representative formation rocks and fluids, and n is a constant that can be determined experimentally on representative formation rocks and fluids.

Archie's equation is appropriate for clean rocks and would not give accurate water-saturation in shaly sands since it does not account for the extra conductivity caused by the clay presence. Therefore, water-saturations obtained from Archie's equation have a tendency to overestimate the water in shaly sands. Some evaluation methods from prior art used saturation equations that can account for the conductivity caused by clay presence in shaly sands. A review of these equations can be found in the paper "The Evolution of Shaly-Sand Concepts in Reservoir Evaluation", which is published 1985 in *The Log Analyst* by Paul F. Worthington. Generally, such equations account for the conductivity caused by clay presence in shaly sands by replacing $C_w$ in Archie's equation with $C_{we}$, effective conductivity. Then, they express $C_{we}$ in terms of $C_w$ and some function of clay or shale attributes.

In other words, they rewrite Archie's equation in one of the following forms;

$$C_t = \Phi_{total}^m \cdot S_{wt}^n \{C_{we}\} \qquad (4)$$

$$C_t = \Phi_{total}^m \cdot S_{wt}^n \{C_w + X\} \qquad (5)$$

Here, X is a function that is needed to account for the conductivity caused by clay presence in shaly sands.

Some solutions based on Equation (5) express X as a function of the shale-volume, $V_{sh}$, shale-conductivity, $C_{sh}$, and perhaps other attributes, i.e. $X = f(V_{sh}, C_{sh}, \ldots)$. One example can be found in the paper "Evaluation of Water Saturations in Shaly Formations", published 1971 by Poupon and Leveaux in SPWLA 12$^{th}$ Annual Logging Symposium. Such equations can enable accurate solutions for $S_{wt}$ if the input quantities, i.e. $C_t$, $C_w$, $\Phi_{total}$, m$^v$, n$^v$ and f($V_{sh}$, $C_{sh}$, ...) are accurate.

For f($V_{sh}$, $C_{sh}$ ...) to be accurate two requirements must be met. First, the functional expression for f($V_{sh}$, $C_{sh}$, ...) must accurately model the conductivity caused by the clay presence in shaly sands. Second, the input quantities in this function ($V_{sh}$, $C_{sh}$ and other formation attributes it may involve) must be accurate. The above two requirements are seldom met, especially the second one.

Other solutions based on Equation (5) express X as a function of the clay-volume, $V_{cl}$, clay-conductivity, $C_{cl}$, and perhaps other attributes, i.e. $X=\xi(V_{cl}, C_{cl}, \ldots)$. One example can be found in the paper "Theoretical and Experimental Bases for The Dual Water Model for The interpretation of Shaly Sands", published 1984 by CLAVIER, C. COATES, G. and DOMANOIR, J. in Society of Petroleum Engineers, Journal 24, 153–167. Another example can be found in the paper "Electrical Conductivities in Oil-Bearing shaly Sands", published 1968 by Waxman M. H. and Smits, L. J. M. in Society of Petroleum Engineers, Journal 8, 107–122.

Such equations can enable accurate solutions for $S_{wt}$ if the input quantities, i.e. $C_t$, $C_w$, $\Phi_{total}$, m$^e$, n$^o$ and $\xi(V_{cl},C_{cl},\ldots)$ are accurate. For $\xi(V_{cl}, C_{cl}, \ldots)$ to be accurate two requirements must be met. First, the functional expression for $\xi(V_{cl}, C_{cl}, \ldots)$ must accurately model the conductivity caused by the clay presence in shaly sands. Second, the input quantities in this function ($V_{cl}$, $C_{cl}$ and other attributes it may involve) must be accurate. The second requirement is rarely met in prior formation evaluation methods.

Such disadvantages have been overcome by the present invention, which utilizes a suitable form of the dual-water saturation equation—Equation (17.a)—to accurately model the conductivity in shaly sands. Furthermore, the input requirements for this equation, namely: $\Phi_{total}$, $S_{cbw}$, m$^o$, n$^o$, $C_{wf}$ and $C_{cbw}$ are obtained accurately, as will be explained below. Then, for a shaly sand geological unit or formation having conductivity $C_t$, as measured by resistivity logs, the water saturation $S_{wt}$ is obtained accurately from the dual-water saturation equation using a robust numerical technique, which will be described below. This numerical method is robust and converges accurately to the solution of the unknown $S_{wt}$ in Equation (17).

According to the present invention, physical well log measurements, from well logging systems like that shown in FIG. 1, for the formations of interest are processed to quantify the effects of clay on such data. The results of processing data according to the present invention accurately indicate hydrocarbon saturation and other attributes concerning the geological unit or formation of interest. During the processing of the well logging data, test data from laboratories or other sources may also be used, as will be described below. FIG. 6 in the drawings illustrates schematically the general sequence of processing according to the present invention.

With reference to FIG. 6, there is depicted a high-level logic flowchart illustrating a method of obtaining a measure of subsurface formation fluid contents adjacent a well borehole in the well logging system W according to the present invention. The method of the present invention performed in the computer 38 of the well logging system can be implemented utilizing the computer program steps of FIG. 6 stored in memory 42 and executable by system processor of computer 38 and also the data resulting from the other steps of FIG. 6 not implemented by the computer 38. Such data is furnished to computer 38 through any suitable form of computer data input device.

In the method depicted in FIG. 6, the process of the present invention begins at process step 100. The initial process step 100 involves characterizing or describing the formation lithology of interest as clay and sand. According to the present invention, clay comprises clay minerals, i.e. montmorillonite, illite, chlorite and kaolinite. Sand comprises anything in shaly sands that is neither clay nor fluid, e.g. quartz, mica and feldspar, organics, and any other possible component.

Next, during a step 102 the most appropriate cross-plots and transforms are used to obtain the formation total-porosity, $\Phi_{total}$. The cross-plots and transforms so used are determined from the available porosity logs from the well logging system of FIG. 1 such as density, neutron and sonic logs. Corrections for environmental (borehole size and fluids) and light-hydrocarbon effects may, if necessary, need to be applied upon these logs to enable more accurate total porosity results.

Processing step 104 is next, and is done to accurately quantify volume of dry-clay, $\mathrm{Vol}_{dry\text{-}clay}$. Processing step 104 may be performed using one or more of the several methods.

Dry-clay volume can be quantified based on conventional techniques such as X-Ray Diffraction, or XRD, and Infra Red Spectroscopy, or IR, of formation rock or cores. Each of these techniques are laboratory experimental procedures that can be used to determine clay abundance in the formation rock. This is done by properly selecting a representative formation rock or core and then preparing it foot-by-foot in a powder form so that the laboratory experiment can be conducted. The results provide weight-percent of the dry-clay in the rock-matrix. FIG. 5 is a graphical representation of typical components of a shaly sand reservoir or formation. Dry-clay weight-percent, $W_{dry\text{-}clay}$, can be transformed to volume percent using the following formula:

$$\mathrm{Vol}_{dry\text{-}clay}=W_{dry\text{-}clay}\cdot\rho_{matrix}\cdot(1-\Phi_{total})/\rho_{dry\text{-}clay} \quad (6)$$

$\mathrm{Vol}_{dry\text{-}clay}$ is the volume of dry-clay in one unit of formation bulk volume, as indicated in FIG. 5. $W_{dry\text{-}clay}$ in Equation (6) is the weight-percent of the dry-clay in the rock-matrix, which is provided by XRD or IR technique. The quantity $\rho_{matrix}$ in Equation (6) is the rock-matrix density, which is provided by laboratory experiments as matrix grain density. Furthermore, $\rho_{matrix}$ can be estimated from prevailing knowledge and experience about the shaly-sand formation rock. The quantity $\rho_{dry\text{-}clay}$ in Equation (6) is the density of the dry-clay in the formation, which can be estimated from clay-types abundances determined by either XRD or IR or both procedures. Moreover, $\rho_{dry\text{-}clay}$ can be estimated from prevailing knowledge and experience about dominant clay types in geological units or formation of interest. $\Phi_{total}$ is the total porosity in the formation and is obtained during processing step 102.

Figure 2:
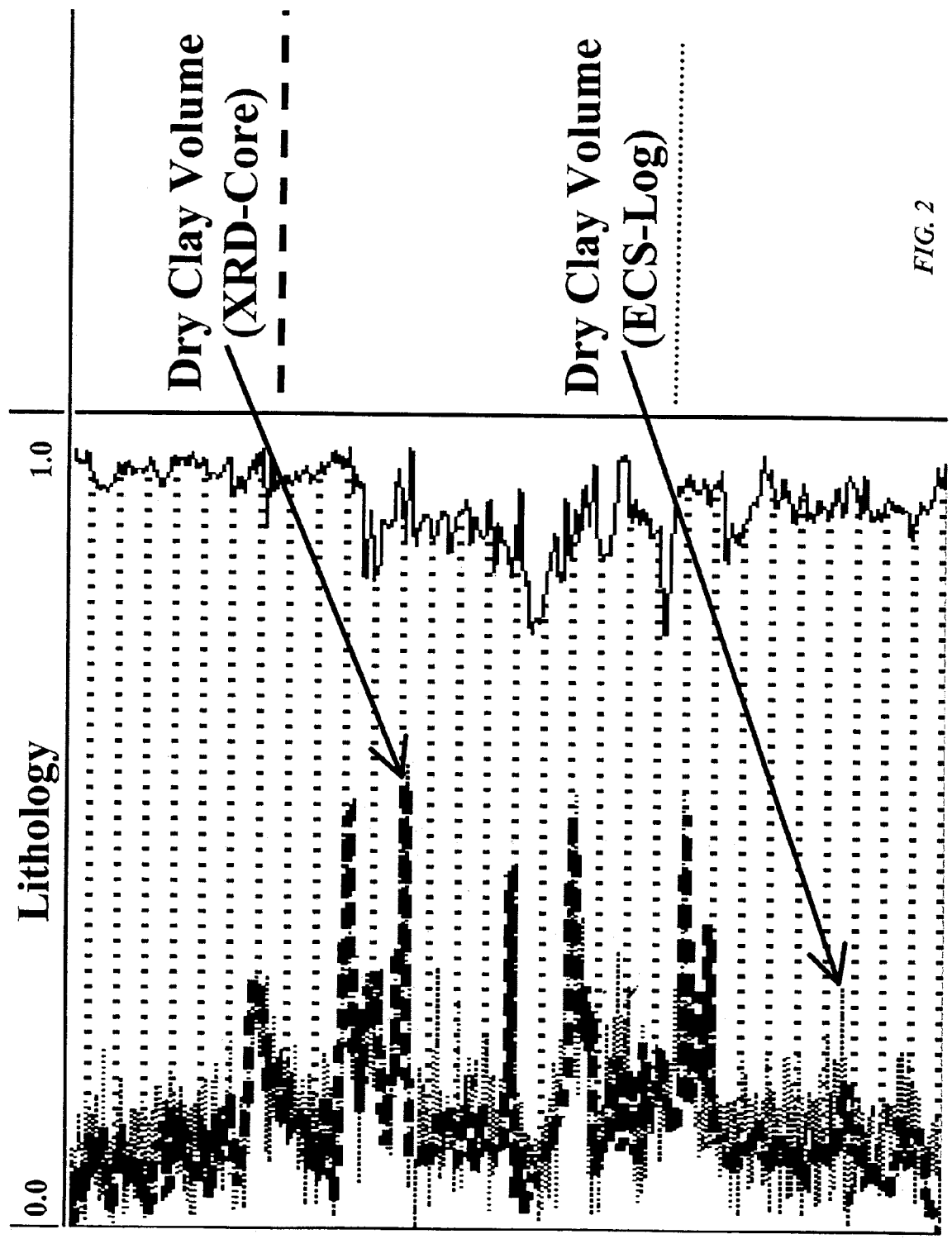
FIG. 2 is an example plot of formation lithology obtained as a function of borehole depth.
Figure 3:
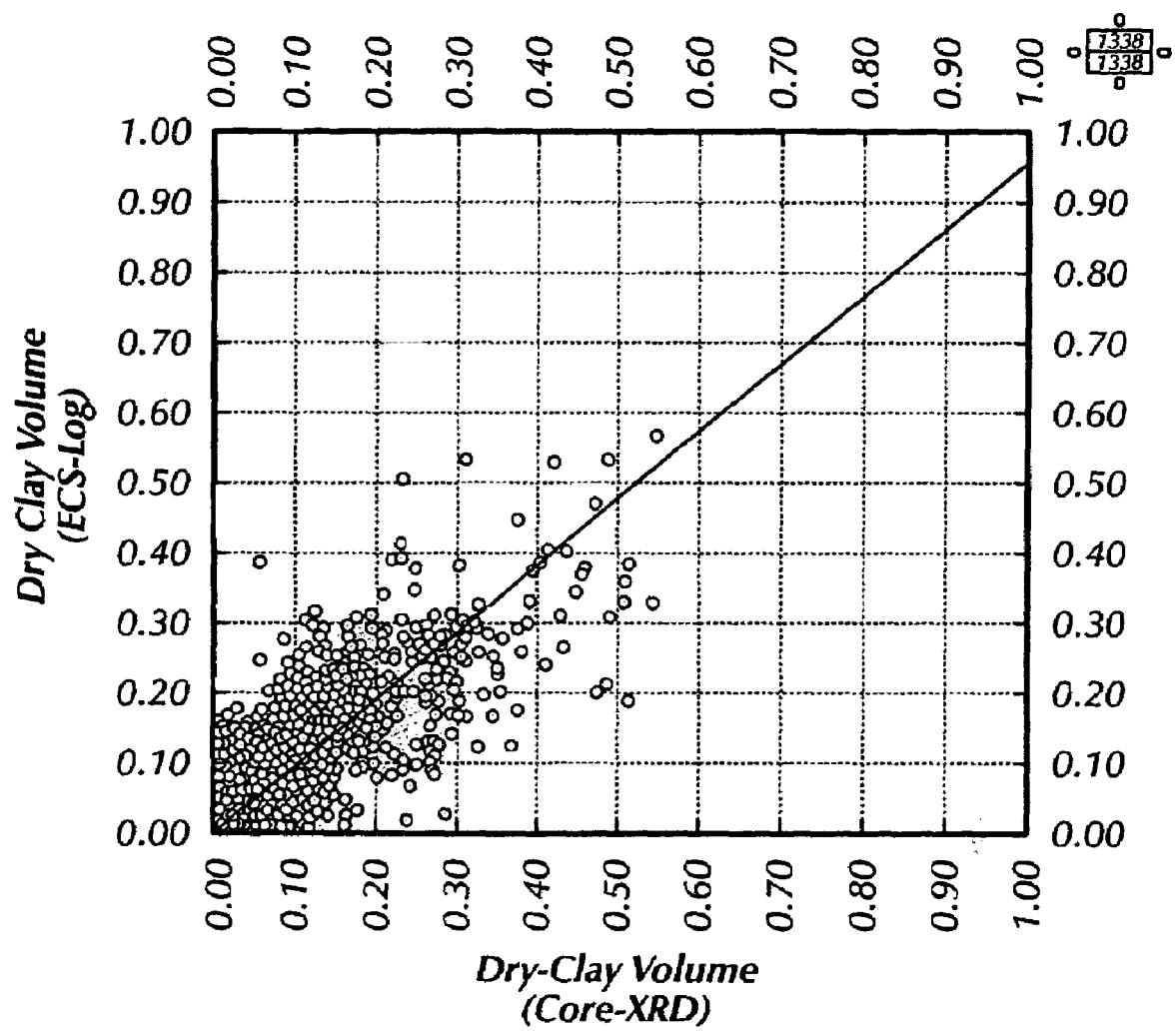
FIG. 3 is a comparison plot of clay abundance data obtained from two different techniques.
Figure 4:
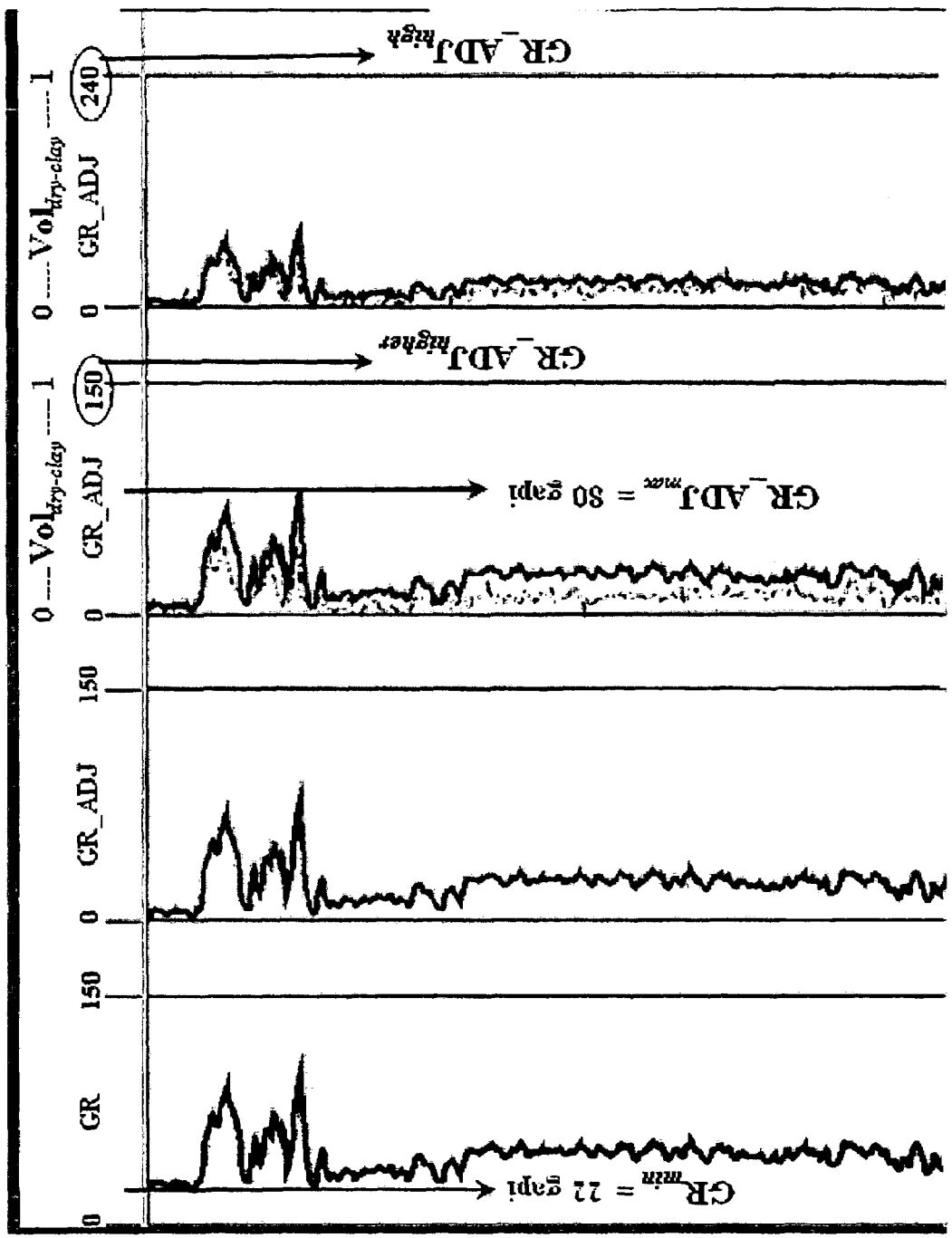
FIGS. 4A, 4B, 4C and 4D are plots of gamma ray well log data as a function of borehole depth obtained from a logging system like that of FIG. 1.

Dry-clay volume can also be quantified from data obtained by an elemental capture spectroscopy log, or ECS log. This type of spectroscopy log is capable of determining the weight-percent of dry-clay in the formation rock-matrix. An example of this is described in U.S. Pat. No. 5,786,595. The dry-clay weight-percent provided by ECS log can be transformed to dry-clay volume-percent in the formation using Equation (6) above. The input data for this determination of dry-clay volume in this manner can be obtained as explained in XRD or IR procedures described above except for $W_{dry\text{-}clay}$, which in this case, is obtained from an ECS log.

Where one or more wells across a formation to be evaluated, have had clay abundance estimated from experimental techniques, such as XRD or IR procedures, and also from ECS logging measurement, the results may be compared. Thus, the clay abundance from an ECS log can be compared with the clay abundance from XRD or IR procedures. FIG. 2 is a plot of dry-clay volume obtained as a function of borehole depth. FIG. 3 is a chart comparing clay abundance data, from ECS logs against XRD procedures, for the same well and interval depicted in FIG. 2. Such a comparison enables calibrating an ECS logging tool to accurately measure clay abundance in the formation to be evaluated. Calibrating the first ECS logs and ECS tool measurements in a formation against XRD/IR data also enhances the reliability of ECS measurements in other wells across the same formation that have no XRD or IR data available.

Dry-clay volume can also be quantified by another well logging technique known as the gamma-ray log or GR log. The GR log is a standard log that measures the natural radioactivity of the formation. Data is acquired from this type of log in every well in a hydrocarbon formation. Hence, GR log is available in wells that have clay abundance measured by ECS log, XRD or IR techniques. The wells $\mu$ ($\mu$=1, 2, 3 ... $\mu_{max}$) having clay abundance measured by ECS, XRD or IR techniques for a geological unit or formation can be utilized in evaluating such geological unit or formation in any other well not having ECS, XRD or IR measurements. First, the clay abundance data in each well $\mu$ need to be transformed from weight-percent to volume-percent using equation (6). Second, in each well $\mu$, gamma-ray corrections for borehole, environmental and potassium effects need to be done on its GR log. Third, the dry-clay volume data, from ECS, XRD or IR, in the wells $\mu$ can be utilized to normalize and calibrate their gamma-ray logs, GR$\mu$, using the following methodology, which will enable using GR log in quantifying dry-clay volume.

The gamma-ray data is initially normalized to the dry-clay volume in each well $\mu$. The first step of such normalization is to display a GR$\mu$ log on an appropriate scale and find its lowest or minimum reading, GR$\mu_{lowest}$=GR$\mu_{min}$. Next the GR$\mu$ log readings are adjusted by removing its lowest reading, or GR$\mu$_ADJ=GR$\mu$−GR$\mu_{min}$.

Then, the dry-clay volume of well $\mu$, Vol$\mu_{dry-clay}$ (whether from ECS, XRD or IR) is displayed on a zero-to-one scale and on the same track display GR$\mu$_ADJ on a scale from zero to GR$\mu$_ADJ$_{higher}$. GR$\mu$_ADJ$_{higher}$ must be higher than the maximum reading of GR$\mu$_ADJ, i.e., GR$\mu$_ADJ$_{max}$<GR$\mu$_ADJ$_{higher}$. Then, the scale-point GR_ADJ$_{higher}$ for the displayed GR$\mu$_ADJ log is changed until scale-point value is achieved that makes the two displayed curves, Vol$\mu_{dry-clay}$ and GR$\mu$_ADJ, most accurately coincide with each other. The scale-point achieved can be termed GR$\mu$_ADJ$_{high}$.

FIGS. 4A, 4B, 4C and 4D illustrate the above steps for obtaining GR$_{min}$, GR_ADJ, GR_ADJ$_{max}$ and GR_ADJ$_{high}$ for an example well. Finally, Equation (7) below is used to obtain dry-clay volume from the Gamma Ray log. The results in a typical formation are mostly overlaying with dry-clay volume from ECS, XRD or IR in well $\mu$. The Gamma Ray normalization steps described above are performed on all wells $\mu$ ($\mu$=1, 2, 3 ... $\mu$max) of interest.

$$Vol\mu_{dry-clay}=GR\mu\_ADJ/GR\mu\_ADJ_{high} \qquad (7)$$

Then, a representative calibration is obtained between GR_ADJ$_{high}$ and GR_ADJ$_{max}$ for the geological unit or formation crossed by the wells $\mu$. First, Equation (8) is used to find the calibration factor $\lambda\mu$ between GR$\mu$_ADJ$_{high}$ and GR$\mu$_ADJ$_{max}$ for every well $\mu$:

$$GR\mu\_ADJhigh=\lambda\mu\cdot GR\mu\_ADJmax \qquad (8)$$

Then a representative calibration factor $\lambda$ is obtained for the geological unit or formation which is crossed by wells $\mu$ (having ECS, XRD or IR data), using the following Equation:

$$\lambda = \left\{\sum_{\mu=1}^{\mu max} \lambda\mu\right\} / (\mu max) \qquad (9)$$

The calibration factor $\lambda$ can then be used in calculating dry-clay volume in any nearby well (having no ECS, XRD or IR) across the same geological unit or formation crossed by wells $\mu$. In doing so, GR, GR$_{min}$, GR_ADJ, GR_ADJ$_{max}$ are obtained for the nearby well using the procedure explained above for normalizing Gamma Ray log as shown in FIGS. 4A–4D. Then GR_ADJ$_{max}$ and the calibration factor $\lambda$ are used to obtain GR_ADJ$_{high}$ for the geological unit or formation in the nearby well based on the following relationship:

$$GR\_ADJ_{high}=\lambda\cdot GR\_ADJ_{max} \qquad (10)$$

Finally, dry-clay volume is obtained for the nearby well from its Gamma Ray data in accordance with the following relationship:

$$Vol_{dry-clay}=GR\_ADJ/GR\_ADJ_{high} \qquad (11)$$

Processing step 106 is next used to calculate clay-bound-water. This calculation may be done from conventional published methods or relations, such as:

$$Vol_{clay-bound-water}=V_Q\cdot Q_v\cdot\Phi_{total} \qquad (12)$$

$$Vol_{clay-bound-water}=V_Q\cdot CEC\cdot\rho_{dry-clay}\cdot Vol_{dry-clay} \qquad (13)$$

In both expressions, $\Phi_{total}$ is the formation total-porosity, which is obtained as described above during step 102. $Q_v$ in Equation (12) is the clay cation-exchange-capacity in milliequivalents per unit volume of pore fluids. $Q_v$ can be determined experimentally on representative formation rocks and fluids. $V_Q$ in Equations (12) and (13) is the amount of clay-bound-water associated with one milliequivalent of clay counterions.

It is known that $V_Q$ is a function of formation temperature and the salinity of the formation water, i.e.:

$$V_Q=\alpha[96/(T^{\circ C}+298)] \qquad (14)$$

$T^{\circ C}$ is the formation temperature in degrees Celsius. $\alpha$ is equal to unity when formation water salinity is greater than 20455 ppm NaCl. Otherwise, $\alpha$ is equal to SQRT (20455/FWS), where FWS is the formation water salinity in ppm NaCl.

Vol$_{dry-clay}$ in Equation (13) is the volume of dry-clay, which can be obtained as described in step 104. $\rho_{dry-clay}$ is the dry-clay density, which can be determined from experience gathered about the prevailing formation clay types and their characteristics. CEC in Equation (13) is the clay Cation-Exchange-Capacity in milliequivalents per unit mass of dry clay. CEC can be obtained from experimental measurements on representative formation rocks or from experience and knowledge gathered about the prevailing formation clay types and their characteristics. Vol$_{clay-bound-water}$ is the volume of clay-bound-water per unit bulk volume of the formation. Equation (15) can be used to get the saturation of clay-bound-water, S$_{cbw}$.

$$S_{cbw}=Vol_{clay-bound-water}/\Phi_{total} \qquad (15)$$

Step 108 is next used to calculate effective-porosity using the following Equation:

$$\Phi_{total} = \Phi_{effective} + Vol_{clay-bound-water} \quad (16)$$

$\Phi_{total}$ and $Vol_{clay-bound-water}$ can be obtained as explained in step 102 and step 106, respectively. $\Phi_{effective}$ is the formation effective-porosity, which is defined as the pore-space occupied by all the formation fluids that are not clay-bound. FIG. 5 illustrates the relative shaly sand rock, minerals and fluid attributes, which can be quantified using techniques described according to the present invention. FIG. 5 is a schematic that shows components per unit bulk volume of a shaly sand reservoir.

Step 110 is next performed to model formation conductivity. This can be done by use of the known dual water saturation equation to model the formation conductivity measured by resistivity logs. Equation (17.a) is the most general form for the dual water saturation equation.

$$C_t = \Phi_{total}^{m^o} S_{wt}^{n^o} \left\{ C_{wf} \frac{S_{wf}}{S_{wt}} + C_{cbw} \frac{S_{cbw}}{S_{wt}} \right\} \quad (17.a)$$

Equation (17.a) splits the conductivity of the total water in the formation into conductivity of the clay-bound-water, $C_{cbw}$, multiplied by its relative abundance, $S_{cbw}/S_{wt}$, plus the conductivity of the free (non-clay) water, $C_{wf}$, multiplied by its relative abundance, $S_{wf}/S_{wt}$. Here, the free-water is the water in the formation that is free from, not bound to, the formation clay and it is given by $S_{wf} = S_{wt} - S_{cbw}$, where $S_{wt}$ is the formation total-water saturation and $S_{cbw}$ is the formation clay-bound-water saturation.

Expressing $S_{wf}$ in terms of $S_{wt}$ and $S_{cbw}$ will enable rewriting Equation (17.a) as:

$$C_t = \Phi_{total}^{m^o} S_{wt}^{n^o} \left\{ C_{wf} + \frac{S_{cbw}}{S_{wt}} [C_{cbw} - C_{wf}] \right\} \quad (17.b)$$

In order to accurately obtain $S_{wt}$, accurate input values for $C_t$, $C_{cbw}$, $C_{wf}$, $\Phi_{total}$, $m^o$, $n^o$ and $S_{cbw}$ are required. Accurate value for $C_t$ can be obtained from deep resistivity logs which are not affected either by mud fluids in the borehole or by mud filtrate in the formation. An accurate value $C_{cbw}$ can be obtained from published dual-water method, which reveals that $C_{cbw}$, in mho/m units, can be expressed as:

$$C_{cbw} = \{(0.0007)(T^{oC} + 8.5)(T^{oC} + 298)(1 - 0.4 \exp(-2C_{wf})/\neq\} \quad (18)$$

where $T^{oC}$ and $\alpha$ are as described in step 106 above. An accurate value for $C_{wf}$ can be determined experimentally on representative formation water samples, and an accurate value for $\Phi_{total}$ can be obtained as described in step 102. The parameters $m^o$ and $n^o$ are determined experimentally on representative formation rock and fluid samples. Accurate representative values for $m^o$ and $n^o$ require experimental measurements of $S_{cbw}$, $C_{cbw}$, $\Phi_{total}$, $S_{wt}$, $C_t$ and $C_{wf}$ on every rock sample and fluid from which $m^o$ and $n^o$ are to be obtained. Then, for every sample such measurements need to be fitted using Equation (17) in order to get accurate fitting values for $m^o$ and $n^o$. The first suite of measurements can address $m^o$ only by sustaining $S_{wt} = 1.0$ and changing $C_{wf}$ in every rock sample for which the above measurements are to be conducted. When an accurate representative value for $m^o$ is obtained, a second suite of measurements can address $n^o$ by sustaining $C_{wf}$ at a value equal to the original formation water conductivity and changing $S_{wt}$ from 100% to lower values in incremental steps at which $C_t$ is measured to enable fitting Equation (17) with an accurate representative value of $n^o$. Finally, the methods described in step 104 and step 106 enable obtaining accurate value for $S_{cbw}$.

Determining $S_{wt}$ also requires an accurate numerical method capable of exploiting the input data $C_t$, $C_{cbw}$, $C_{wf}$, $\Phi_{total}$, $S_{cbw}$, $m^o$ and $n^o$ described above and solving Equation (17) for the unknown $S_{wt}$. The present invention enables getting an accurate measure $S_{wt}$ from Equation (17) for the input data described above and has the capability of handling any values for $m^o$ and $n^o$.

According to the numerical method, Equation (17) is rearranged in the following form:

$$C_t / \Phi_{total}^{m^o} = S_{wt}^{n^o} \cdot C_{wf} + S_{wt}^{n^o - 1} \cdot S_{cbw} [C_{cbw} - C_{wf}] \quad (19)$$

Three functions are then defined as follows:

$$f_1 = C_{wf} \quad (20)$$

$$f_2 = S_{cbw} \cdot [C_{cbw} - C_{wf}] \quad (21)$$

$$f_3 = C_t / \Phi_{total}^{m^o} \quad (22)$$

Equation (19) is then rewritten, after substitution according to Equations (20), (21) and (22), in the following form:

$$f_1 \cdot S_{wt}^{n^o} + f_2 \cdot S_{wt}^{n^o - 1} - f_3 = 0 \quad (23)$$

Equation (23) is then solved for the unknown $S_{wt}$, which, by definition, can take values in the range between 0.0 and 1.0 only. The following numerical method converges to an accurate answer $S_{wt}$ with a tolerance $\delta$. When the answer $S_{wt}$ so obtained is substituted in Equation (23), the left side of Equation (23) converges to zero (as indicated on right-side of Equation (23)) with a tolerance $\epsilon$. Here, $\delta$ and $\epsilon$ are extremely small numbers that can be chosen as tolerance criteria.

The numerical method expressed in Fortran programming language is as follows:

```
REAL, N
N = n°
        iter = 0
        sat1 = 0.0
        sat2 = 1.0
        fxmid = f₁ · (sat2)ᴺ + f₂ · (sat2)ᴺ⁻¹ − f₃
        fx = f₁ · (sat1)ᴺ + f₂ · (sat1)ᴺ⁻¹ − f₃
    if(fx < 0.0) then
        satbis = sat1
        delsat = sat2 − sat1
    else
        satbis = sat2
        delsat = sat1 − sat2
    endif
    do 11 iter = 1,imax
        delsat = 0.50 · delsat
        satmid = satbis + delsat
        fxmid = f₁ · (satmid)ᴺ + f₂ · (satmid)ᴺ⁻¹ − f₃
        if(fimid <= 0.0) then
            satbis = satmid
        endif
        if (absolute_value(delsat) < δ and absolute_value(fxmid) < ε)
        then
            satbis = satmid
            S_wt = satbis
            Return
        endif
        S_wt = satbis
    End do 11
Return
End
```

The above numerical method can solve Equation (17) for any value of n°. Nonetheless, when n°=2.0, Equation (17) has the analytical solution shown below, which can be used to check the accuracy of the above numerical method when n°=2.0;

$$S_{wt} = U + SQRT\{U^2 + V\}, \text{ where} \tag{24}$$

$$U = \{S_{cbw} \cdot (C_{wf} - C_{cbw})/(2 \cdot C_{wf})\} \text{ and} \tag{25}$$

$$V = C_t / (\Phi_{total}^{m°} \cdot C_{wf}) \tag{26}$$

It can thus be seen that the requirements of accurate input data values and an accurate technique of processing those data values are met by the methods and techniques of this invention. In particular, the present invention has unique capabilities for getting accurate value for $S_{cbw}$ (steps 102, 104 and 106) and in obtaining accurate numerical solution for Equation (17). Consequently, the methodology of the present invention is capable of obtaining accurate solution for $S_{wt}$.

Step 112 is then performed using the accurately calculated $S_{wt}$ and $S_{cbw}$, from steps 110 and 106, to obtain accurate free water saturation, $S_{wf}$, and effective water saturation, $S_{effective}$, based on the following relationships $$S_{wf} = S_{wt} - S_{cbw} \tag{24}$$

$$S_{effective} = S_{wf} \cdot \Phi_{total} / (\Phi_{total} - \text{Vol}_{clay-bound-water}) = S_{wf} / (1 - S_{cbw}) \tag{25}$$

$S_{wf}$ in Equation (24) is the saturation of the water that is free from clay or not bound to the clay. $S_{effective}$ in Equation (25) is the percentage of the effective porosity occupied by the free water. Step 114 is then performed, with the display 40, as in FIG. 1, forming a visible record for the results of the processing depicted schematically in FIG. 6 and described above.

With the present invention, it can thus be seen that disadvantages of conventional formation evaluation of shaly sands have been overcome by the methodology of this invention. The present invention accurately quantifies total-porosity, clay and clay-bound-water, then uses them in the accurate relation of the actual physical condition of the formation, as expressed in Equation (16), to obtain accurate effective-porosity.

The disadvantages of conventional formation evaluation of shaly sands have been overcome by the methodology of the present invention, which accurately quantifies clay-volume, $\text{Vol}_{clay}$ and clay-bound-water, $S_{cbw}$. Furthermore, the present invention incorporates successful methods for obtaining accurate values for $\Phi_{total}$, m°, n°, $C_{wf}$ and $C_{cbw}$. Then, for a shaly-sand geological unit or formation having conductivity $C_t$, the present invention utilizes the dual-water saturation equation, Equation (17), to accurately model the conductivity in the shaly-sand geological unit or formation. Then, the present invention uses robust numerical method to obtain accurate $S_{wt}$ from equation (17).

The present invention has positive and valuable merits for formation evaluation. It uses well logging data to accurately quantify: clay-volume, clay-bound-water, total and effective porosities, water and hydrocarbon saturations in shaly and clean sands.

Techniques obtained with the present invention and techniques from the prior art methods in formation evaluation have been tested in a number of shaly-sand reservoirs and in several wells. The results were compared to actual formation data such as core-XRD data, and core-porosity data. The results of the present invention were found to be better matched to actual data than prior methods. Furthermore, when formation evaluation results of the present invention were compared to well-testing results, the results obtained from the present invention methodology better agreed with well-testing results than the prior methods. By using the present invention, interested parties will be able to assess hydrocarbon reserves more accurately and make cost-effective decisions and plans for completing and producing newly drilled wells.

EXAMPLE# 1

Figures 7A, 7B, 7C:
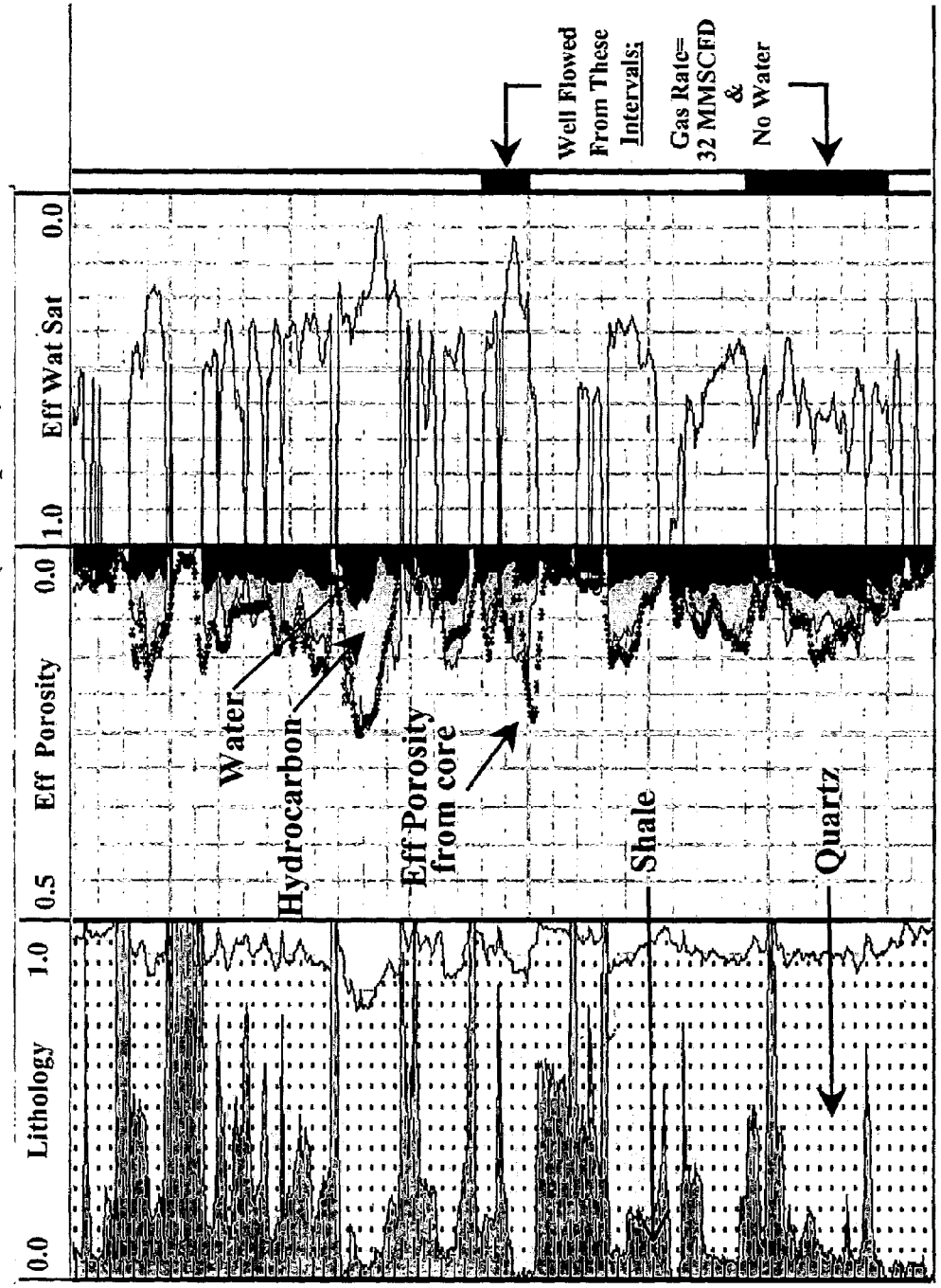
FIGS. 7A, 7B and 7C are plots of well logs of lithology, effective porosity and effective water saturation, respectively, as a function of borehole depth in a well obtained from prior art formation evaluation techniques.

This example was solved using a methodology from the prior art formation evaluation, which uses Equation (2) for effective-porosity and Equation (4), with $C_{we} = \{SQRT[C_w \cdot (1-V_{sh})^m] + V_{sh} \cdot SQRT(C_{sh}/\Phi_{total}^m)\}^2$, for water saturation. The results are shown in the three tracks in FIGS. 7A–7C. FIG. 7A displays the lithology, which is composed of shale and quartz. FIG. 7B shows the effective porosity which is composed of water (shown in those areas along the right margin of FIG. 7B) and hydrocarbon (shown in FIG. 7B in those areas to the left of the water). Additionally, core effective-porosity is displayed by a dark trace line in FIG. 7B as a function of depth for benchmarking. The difference between core effective-porosity and prior-art formation evaluation effective-porosity, $\Delta \Phi_{prior-art} = (\Phi_{effective})_{core} - (\Phi_{effective})_{prior-art}$, was computed at each depth point. Then, $\Delta \Phi_{prior-art}$ was averaged over the whole cored interval and found that $(\Delta \Phi_{prior-art})_{average} = 1.10$ porosity units. FIG. 7C shows the determined effective-water saturation.

Figures 8A, 8B, 8C:
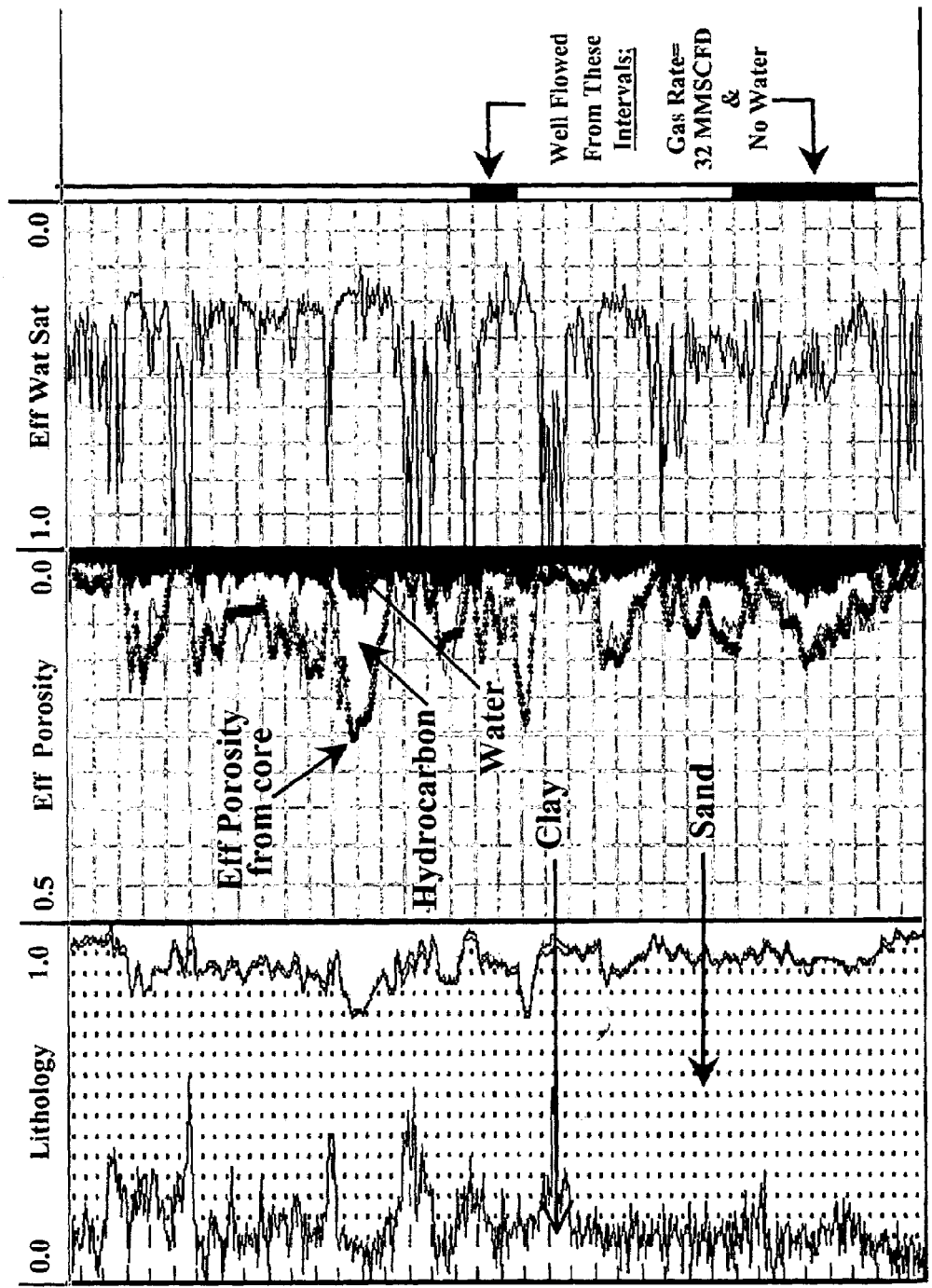
FIGS. 8A, 8B and 8C are plots of well logs of lithology, effective porosity and effective water saturation, respectively, obtained according to the present invention as a function of the same borehole depth as the logs of FIGS. 7A, 7B and 7C.

This same example was also solved using the methodology of the present invention. The results are shown in FIG. 8A which displays the lithology, as Sand (quartz+mica+feldspar+etc.) and Clay. FIG. 8B shows the effective-porosity which is composed of water (shown in those areas along the right margin of FIG. 8B) and hydrocarbon (shown in FIG. 8B in those areas to the left of the water). Additionally, core effective-porosity is displayed in FIG. 8B for benchmarking. The difference between core effective-porosity and new formation evaluation effective-porosity, $\Delta \Phi_{new-method} = (\Phi_{effective})_{core} - (\Phi_{effective})_{new-method}$, was computed at each depth point. Then, $\Delta \Phi_{new-method}$ was averaged over the whole cored interval and found that $(\Delta \Phi_{new-method})_{average} = 0.14$ porosity units. FIG. 8C displays the effective-water saturation.

The well from which this example came was tested for flow from two integrated-intervals which are displayed in FIGS. 7 and 8. This well flowed from the two intervals 32.1 million-standard-cubic-feet-per-day of gas, 2909 barrel-per-day of condensate-gas and no formation-water at 4940 pound-per-square-inch flowing well-head pressure. The well-test results are summarized on the plots of FIGS. 7 and 8 for benchmarking the results. It can be recognized from the results that the present invention better agrees with core data and well-test results than the prior-art method.

EXAMPLE# 2

Figures 9A, 9B, 9C:
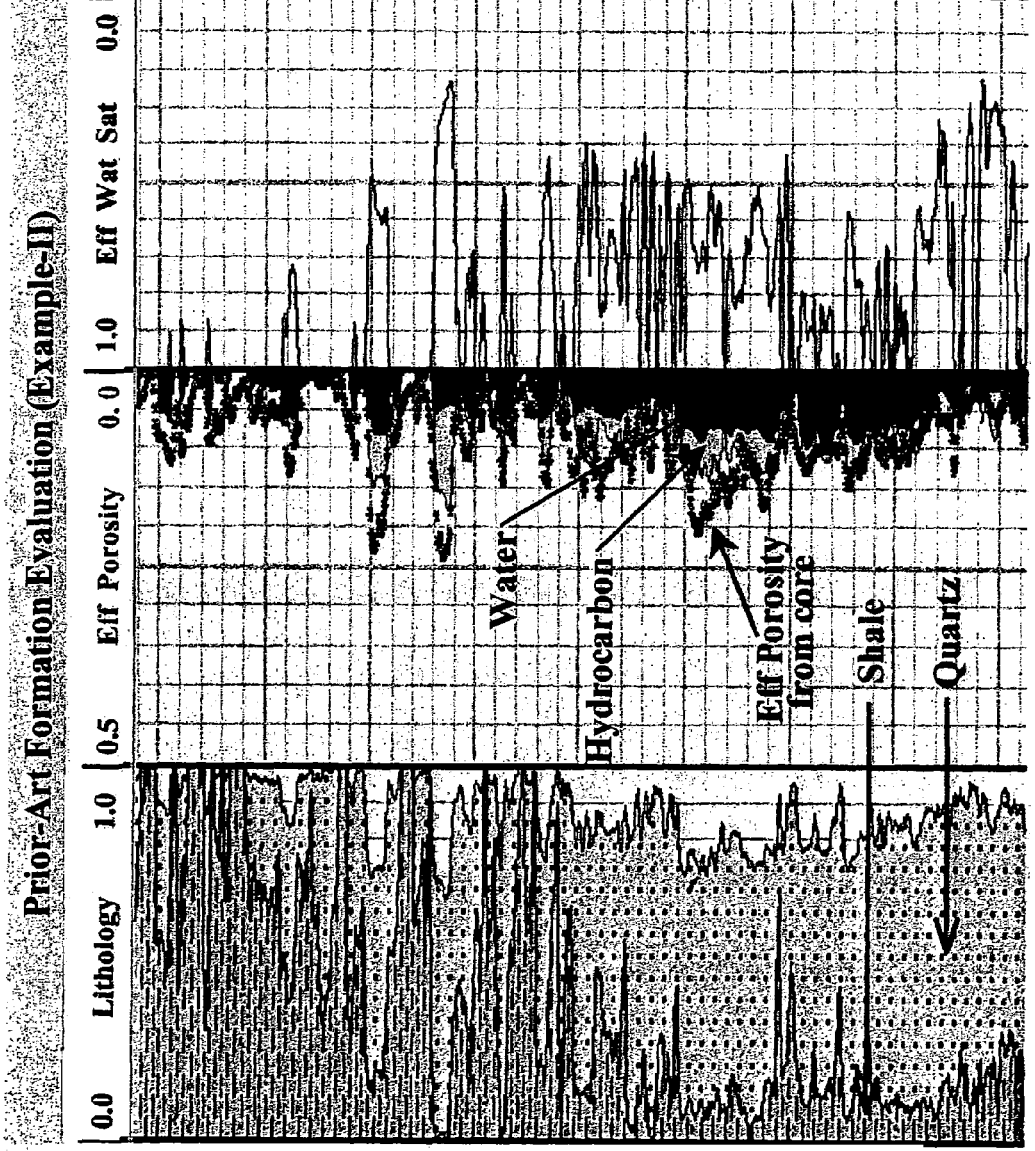
FIGS. 9A, 9B and 9C are plots of well logs of lithology, effective porosity and effective water saturation, respectively, as a function of borehole depth in a well obtained from prior art formation evaluation techniques.

This example was solved using a methodology from the prior art formation evaluation, which uses Equation (2) for effective-porosity and Equation (4), with $C_{we} = \{SQRT[C_w \cdot (1-V_{sh})^m] + V_{sh} \cdot SQRT(C_{sh}/\Phi_{total}^m)\}^2$, for water saturation. The results are shown in FIGS. 9A–9C. FIG. 9A displays the lithology, which is composed of shale and quartz. FIG. 9B shows the effective porosity which is composed of water (shown in those areas along the right margin of FIG. 9B) and hydrocarbon (shown in areas to the left of the water). Additionally, core effective-porosity is displayed by a dark trace line in FIG. 9B as a function of depth for benchmarking. The difference between core effective-porosity and prior-art formation evaluation effective-porosity, $\Delta \Phi_{prior-art} = (\Phi_{effective})_{core} - (\Phi_{effective})_{prior-art}$, was computed at each depth point. Then, $\Delta \Phi_{prior-art}$ was averaged over the whole cored interval and found that ($\Delta \Phi_{prior-art})_{average} = 2.01$ porosity units. FIG. 9C shows the effective-water saturation.

Similarly, this example was solved using the methodology of the present invention. The results are shown in FIGS. 10A–10C. FIG. 10A displays the lithology, which is Sand (quartz+mica+feldspar+ . . . ) and Clay. FIG. 10B shows the effective-porosity which is composed of water shown in those areas along the right margin of FIG. 10B, and hydrocarbon shown in FIG. 10B in those areas to the left of the water. Additionally, core effective-porosity is displayed in FIG. 10B for benchmarking. The difference between core effective-porosity and new formation evaluation effective-porosity, $\Delta \Phi_{new-method} = (\Phi_{effective})_{core} - (\Phi_{effective})_{new-method}$, was computed at each depth point. Then, $\Delta \Phi_{new-method}$ was averaged over the whole cored interval and found that ($\Delta \Phi_{new-method})_{average} = -0.09$ porosity units. FIG. 1C displays the effective water-saturation.

The well from which this example came was tested for flow from three integrated-intervals which are displayed in FIGS. 9 and 10. The well flowed from the three intervals 8.2 million-standard-cubic-feet-per-day of gas, 176 barrels-per-day of gas-condensate and no formation-water at 765 pound-per-square-inch flowing well-head pressure. The well-test results are summarized on the plots of FIGS. 9 and 10 for benchmarking the results. It can again be recognized from results that the present invention better agrees with core data and well-test results than the prior art method.

EXAMPLE# 3

Figures 11A, 11B, 11C:
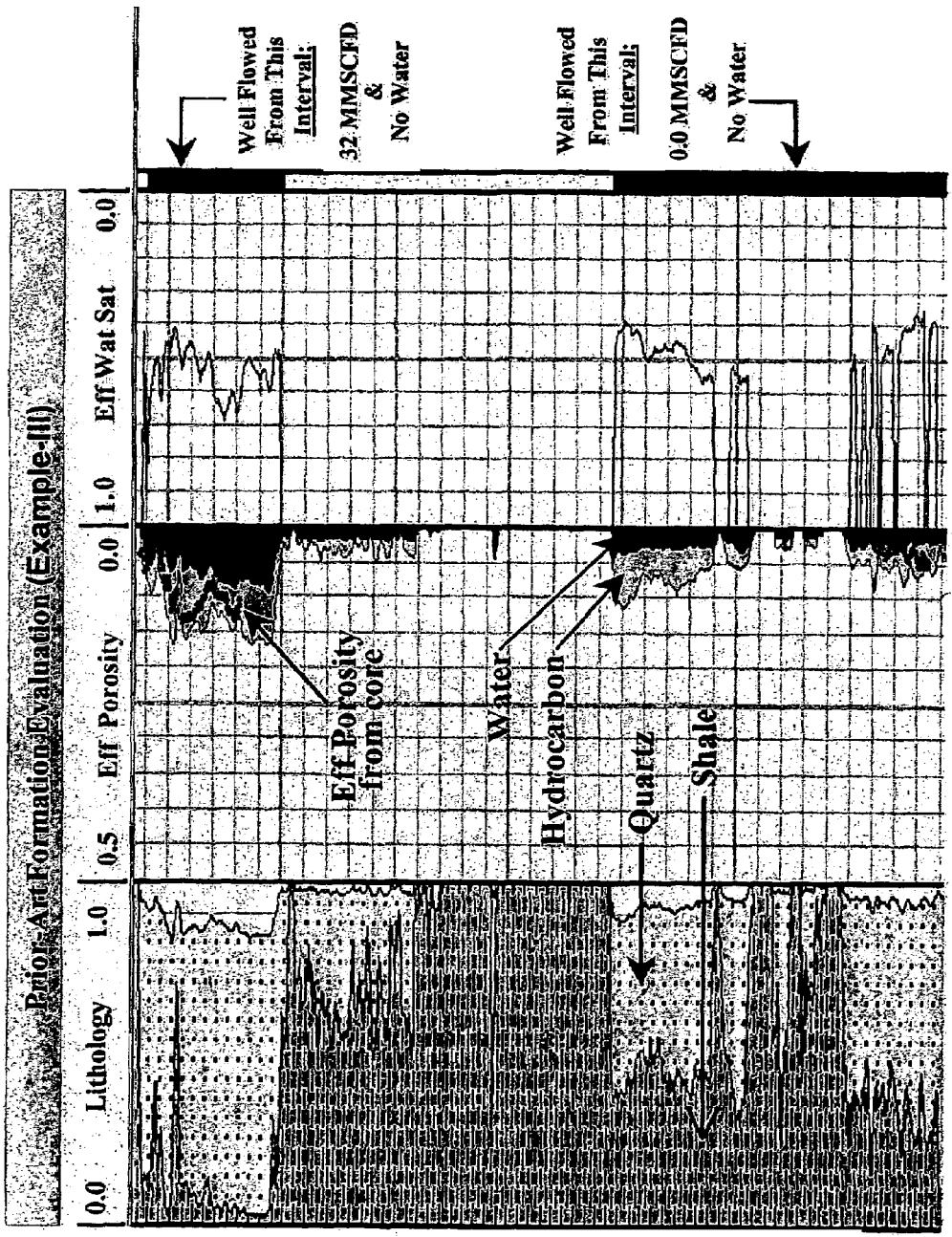
FIGS. 11A, 11B and 11C are plots of well logs of lithology, effective porosity and effective water saturation, respectively, as a function of borehole depth in a well obtained from prior art formation evaluation techniques.

This example was solved using a methodology from the prior art formation evaluation, which uses Equation (2) for effective-porosity and Equation (4), with $C_{we} = \{SQRT[C_w \cdot (1-V_{sh})^m] + V_{sh} \cdot SQRT(C_{sh}/\Phi_{total}^m)\}^2$, for water saturation. The results are shown in FIGS. 11A–11C. FIG. 11A displays the lithology, which is composed of shale and quartz. FIG. 11B shows the effective porosity which is composed of water (shown along the right margin of FIG. 11b) and hydrocarbon (shown to the left of the water). Additionally, core effective-porosity is displayed at FIG. 11B for benchmarking. The difference between core effective-porosity and prior-art formation evaluation effective-porosity, $\Delta \Phi_{prior-art} = (\Phi_{effective})_{core} - (\Phi_{effective})_{prior-art}$, was computed at each depth point. Then, $\Delta \Phi_{prior-art}$ was averaged over the whole cored interval and found that ($\Delta \Phi_{prior-art})_{average} = -2.50$ porosity units. FIG. 11C shows the effective water-saturation.

Figures 12A, 12B, 12C:
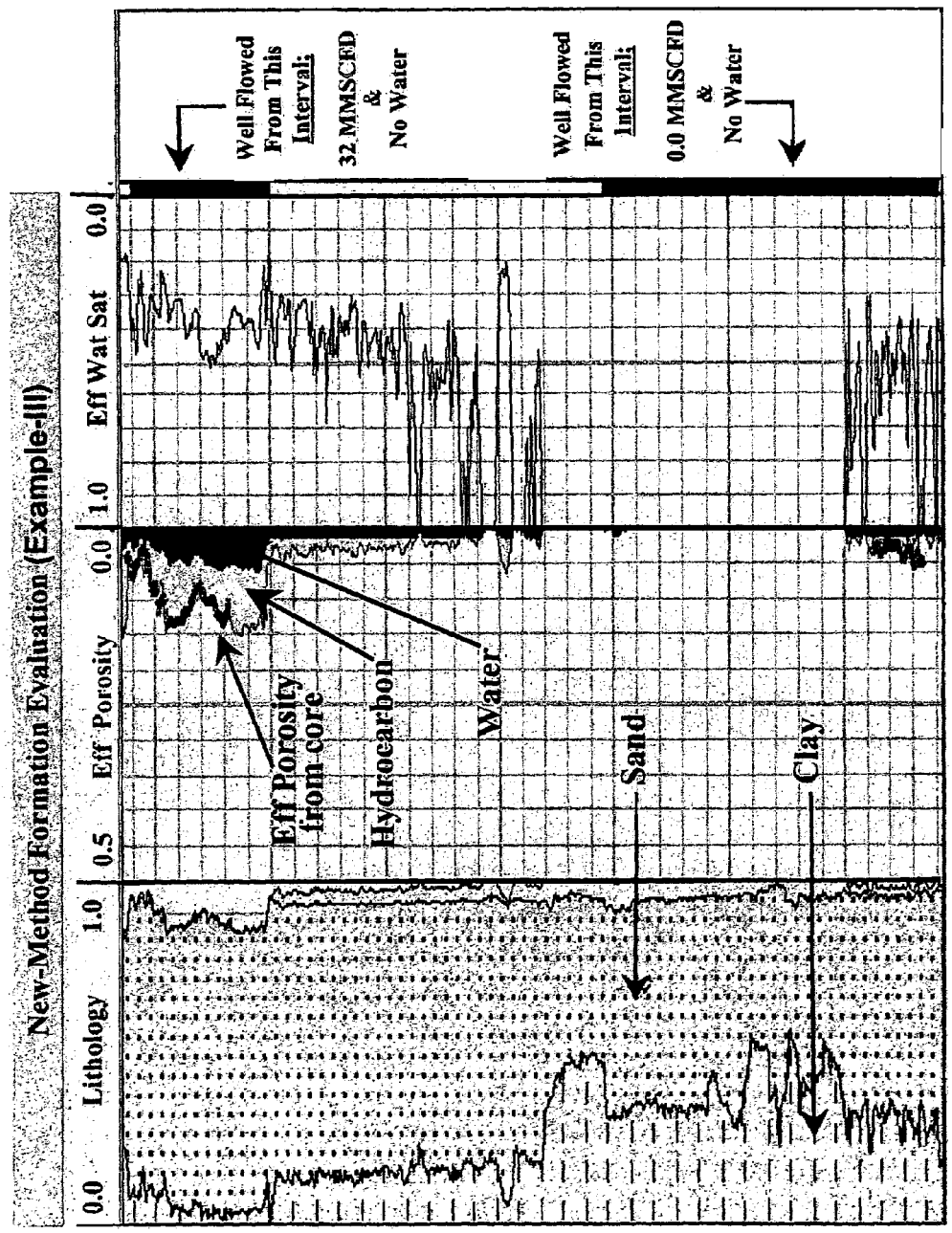
FIGS. 12A, 12B and 12C are plots of well logs of lithology, effective porosity and effective water saturation, respectively, obtained according to the present invention as a function of the same borehole depth as the logs of FIGS. 11A, 11B and 11C.

This example was also solved using the methodology of the present invention. The results are shown in FIGS. 12A–12C. FIG. 12A displays the lithology, which is Sand (quartz+mica+feldspar+ . . . ) and Clay. FIG. 12B shows the effective-porosity which is composed of water (shown along the right margin of FIG. 12B) and hydrocarbon (shown to the left of the water). Additionally, core effective-porosity is displayed in FIG. 12B for benchmarking. The difference between core effective-porosity and new formation evaluation effective-porosity, $\Delta \Phi_{new-method} = (\Phi_{effective})_{core} - (\Phi_{effective})_{new-method}$, was computed at each depth point. Then, $\Delta \Phi_{new-method}$ was averaged over the whole cored interval and found that ($\Delta \Phi_{new-method})_{average} = 0.30$ porosity units. FIG. 12C displays the effective water-saturation.

The well of this example was tested for flow from two independent-intervals separately as indicated in FIGS. 11 and 12. The well flowed from the upper interval, 32.3-million-standard-cubic-feet-per-day of gas, 633 barrel-per-day of gas-condensate and no formation-water at 1643 pound-per-square-inch flowing well-head pressure. The well could not flow anything from the bottom interval. The well-test results are summarized on the plots of FIGS. 11 & 12 for benchmarking the results. It can again be recognized from the results that the present invention better agrees with core data and well-test results than the prior art method does.

Having described the invention above, various modifications of the techniques, procedures, material, and equipment will be apparent to those in the art. It is intended that all such variations within the scope and spirit of the appended claims be embraced thereby.

The invention claimed is:

1. A method of obtaining a measure of subsurface formation water saturation characteristics adjacent a well borehole in a formation characterized as containing a shaly sand, clay, and fluid as formation constituents, comprising the steps of:
   obtaining a measure of the total porosity of the formation based on measurements obtained from a porosity log;
   obtaining a measure of the dry clay volume of the formation based on measurements obtained from the group consisting of an X-ray, gamma ray log, or elemental capture spectroscopy log;
   obtaining a measure of the clay-bound water volume of the formation based on the obtained measure of the total porosity and a measure of a clay cation-exchange-capacity;
   determining the effective porosity of the formation based on the obtained measure of the clay-bound-water volume and the obtained measure of the total porosity;
   obtaining a measure of the total water saturation of the formation based on the obtained measure of the total porosity and on an obtained model of formation conductivity;
   obtaining a measure of the clay-bound water saturation of the formation based on the obtained measure of the total porosity and the obtained measure of the clay-bound-water volume;
   determining the free water saturation of the formation based on the obtained measure of the clay-bound-water saturation and the obtained total water saturation; and
   determining the effective water saturation of the formation based on the obtained measure of the free water saturation and the obtained measure of the total porosity.

2. The method of claim 1, further including the step of:
   determining the hydrocarbon saturation of the formation based on the determined effective water saturation.

3. The method of claim 1, wherein porosity log is a density log.

4. The method of claim 1 wherein the porosity log is a neutron log.

5. The method of claim 1, wherein porosity log is a sonic log.

6. The method of claim 1, wherein the step of obtaining a measure of the dry-clay volume of the formation comprises the step of:
   determining clay abundance in the formation rock from laboratory data.

7. The method of claim 1, wherein the step of obtaining the volume of clay-bound-water is based on the obtained measure of the dry-clay volume.

8. The method of claim 1, wherein the step of obtaining a model of the formation conductivity is based on data obtained from resistivity logs of the formation.

9. The method of claim 1, wherein the step of determining the free water saturation of the formation is performed based on an obtained model of formation conductivity.

10. The method of claim 1, wherein the step of determining the effective water saturation of the formation is performed based on an obtained model of formation conductivity.

11. A data processing system for obtaining measures of subsurface water saturation characteristics adjacent a well borehole in a formation characterized as containing shaly sand, clay, and fluid as formation constituents, based on measurements obtained about the formation, the data processing system comprising:

a processor for performing the steps of:

obtaining a measure of the total porosity of the formation based on measurements obtained from a porosity log;

obtaining a measure of the clay-bound water volume of the formation based on the obtained measure of the total porosity and a measure of a clay cation-exchange-capacity;

determining the effective porosity of the formation based on the obtained measure of the clay-bound-water volume and the obtained measure of the total porosity;

obtaining a measure of the total water saturation of the formation based on the obtained measure of the total porosity and on an obtained model of formation conductivity;

obtaining a measure of the clay-bound water saturation of the formation based on the obtained measure of the total porosity and the obtained measure of the clay-bound-water volume;

determining the free water saturation of the formation based on the obtained measure of the clay-bound-water saturation and the obtained total water saturation; and determining the effective water saturation of the formation based on the obtained measure of the free water saturation and the obtained measure of the total porosity;

a data output display for providing the results of the processing by the processor.

12. The data processing system of claim 11, wherein the processor further performs step of:

obtaining a measure of the dry clay volume of the formation based on measurements obtained from the group consisting of an X-ray, gamma ray log, or elemental capture spectroscopy log.

13. A computer program product stored in signal bearing media for causing a data processor to obtain a measure of subsurface formation water saturation characteristics adjacent a well borehole in a formation characterized as containing shaly sand, clay and fluid as formation constituents based on measurements obtained from the formation, the computer program product containing instructions stored in machine-readable code and causing the processor to perform the following steps:

obtaining a measure of the total porosity of the formation based on measurements obtained from a porosity log;

obtaining a measure of the clay-bound water volume of the formation based on the obtained measure of the total porosity and a measure of a clay cation-exchange-capacity;

determining the effective porosity of the formation based on the obtained measure of the clay-bound-water volume and the obtained measure of the total porosity;

obtaining a measure of the total water saturation of the formation based on the obtained measure of the total porosity and on an obtained model of formation conductivity;

obtaining a measure of the clay-bound water saturation of the formation based on the obtained measure of the total porosity and the obtained measure of the clay-bound-water volume;

determining the free water saturation of the formation based on the obtained measure of the clay-bound-water saturation and the obtained total water saturation; and determining the effective water saturation of the formation based on the obtained measure of the free water saturation and the obtained measure of the total porosity.

14. The computer program product of claim 13, further including the product containing in the instructions stored in machine-readable code for causing the processor to perform the step of:

obtaining a measure of the dry clay volume of the formation based on measurements obtained from the group consisting of an X-ray, gamma ray log, or elemental capture spectroscopy log.

* * * * *